Figure 1:
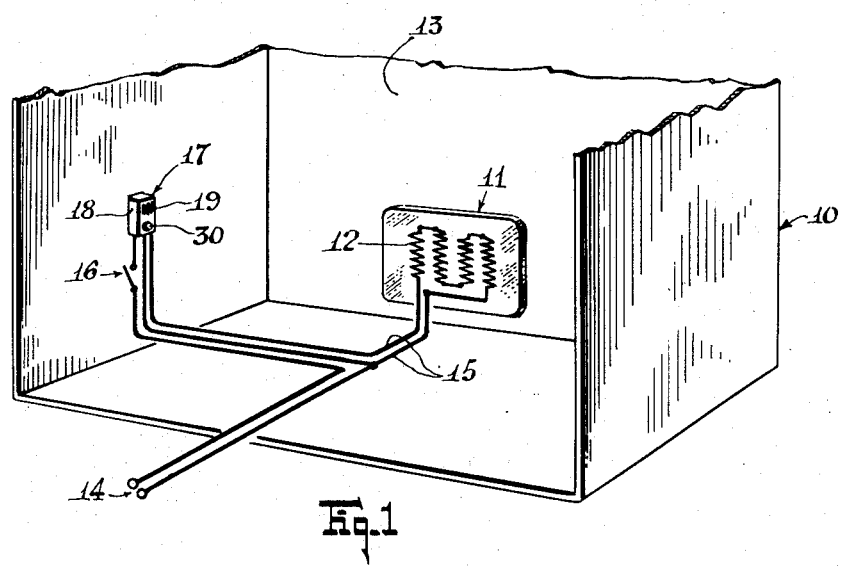

Aug. 18, 1953     J. J. DIETZ     2,649,530
RADIANT HEATING SYSTEM

Filed Sept. 6, 1950

Inventor
John J. Dietz

By Henry Lanahan
Attorney

Patented Aug. 18, 1953

2,649,530

UNITED STATES PATENT OFFICE 2,649,530

RADIANT HEATING SYSTEM

John J. Dietz, New Milford, N. J., assignor to Thomas A. Edison, Incorporated, West Orange, N. J., a corporation of New Jersey Application September 6, 1950, Serial No. 183,380

2 Claims. (Cl. 219—20)

This invention relates to an intermittently-operated room-heating installation using a radiant-type heater, and more particularly it relates to a novel association of a room thermostat with a radiant source of heat to provide a controlled thermal radiation into a room to maintain a heating effect therein for maximum bodily comfort irrespective of variations in outside temperature.

The usual thermostat responds directly to ambient air temperature and not to the degree of heat irradiation. When such a thermostat is utilized in a radiant-type heating system, it endeavors to maintain a constant air temperature in the room. However, maintenance of constant air-temperature is not desirable when the heating source is of the radiant type since such constant temperature will not give a person a feeling of even heating effect with changes in outdoor temperature. For instance, if the outdoor temperature should fall, such thermostat would call for more heat than is needed, to cause the person in the room to feel uncomfortably warm, this being particularly true when the response lag of the thermostat plus the transfer lag between the heater and thermostat is long relative to the lag of the radiant heating source itself; on the other hand, if the outdoor temperature should rise, such thermostat would call for less heat than is required, to cause the person to feel cold. These conditions arise because air, being highly diathermous, is heated only slightly by thermal radiation, whereas a person will absorb radiation efficiently and be heated thereby.

A radiant-energy sensing thermostat would not maintain constant air temperature, but would let the room temperature fall and rise somewhat with falling and rising outdoor temperature to maintain a condition of nearly equal comfort to a person in the room, the amount of such room-temperature variation being greater the smaller the amount of convection heat from the radiating heater and from the irradiated walls of the room. However, radiant-energy sensing thermostats of practical form are not commercially available.

I have found that the make-break type of room thermostat having an associated heater—which type is itself well known—is usable with a radiant source of heat to control that source in substantially the same manner as it would be were a radiant-energy sensing thermostat employed. The make-break contacts of such thermostat and the associated thermostatic heater are connected serially in the line of the electrically-operated radiant-heating panel. As will be apparent, the thermostatic heater operates to cause the room air temperature to fall and rise by a definite and controllable amount with falling and rising outdoor temperature—which is respectively with increasing and decreasing surface temperature of the radiant-heater panel—to maintain a condition of maximum comfort to persons in the room. Also, the thermostatic heater prevents overshooting of temperature during the heating intervals of each make-break cycle. This type of thermostat will cycle at a fair rate, say once per minute, to minimize the cyclic temperature variations and insure a more even heating effect. Because of such desired rate of make-break cycling of the heater, I preferably employ a thermostat of the glass-sealed, hydrogen-filled type, in order to obtain long contact life and a high operating efficiency.

Accordingly, objects of my invention are to provide a novel and practical form of radiant-type room-heating system, to provide such heating system wherein commercially-available elements are associated in novel relationship to maintain a degree of radiant heating for maximum bodily comfort irrespective of outdoor temperatures, and to provide such heating system which is efficient, dependable and long-lived.

More particularly, it is an object of my invention to provide a novel, radiant-type room-heating system wherein a thermostatic element, itself responsive substantially only to ambient air temperature, is heated locally in proportion to the energizing current of the radiant heating source, and is influenced thermally by that source only in proportion to the convection heat produced thereby in the room, so as to control that source in a manner which will give an even degree of bodily comfort to a person in the room irrespective of variations in outside temperature.

Still more particularly, it is an object to provide an improved thermostatic controller for a radiant-type heating system.

Figure 2:
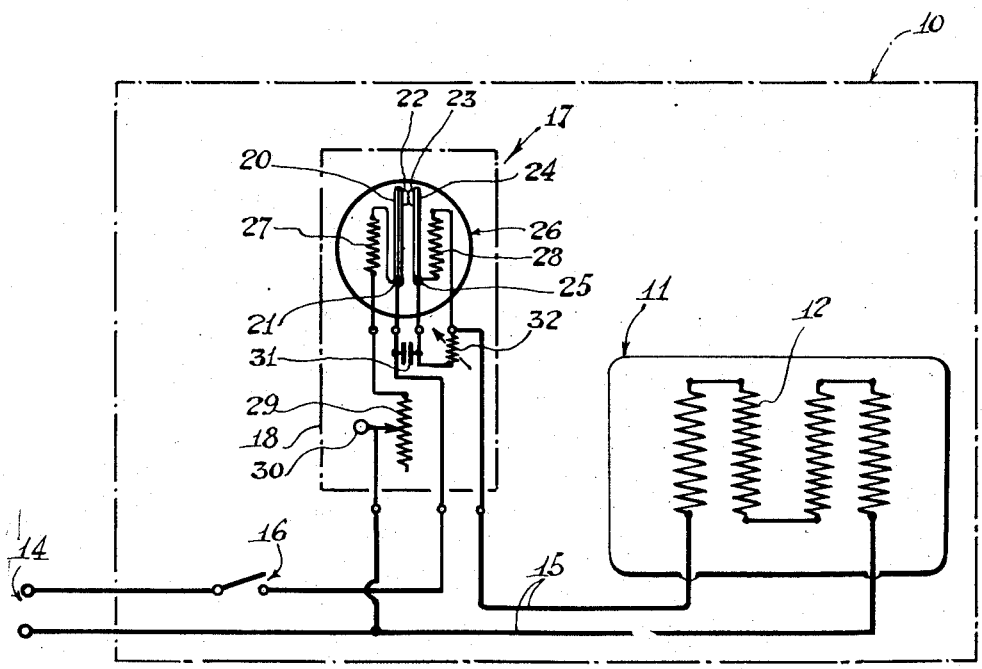

In the description of my invention reference is had to the accompanying drawings, of which:

Figure 1 is a diagrammatic view of a radiant-type room-heating installation in accordance with the present invention; and Figure 2 is a schematic drawing of the present radiant-type heating system showing the room thermostat in detail.

In the figures, 10 represents a room or other desired region which is to be heated. The source of heat is a panel 11 of glass or other suitable insulating material in which is embedded a heater wire 12. This heating panel is mounted in a convenient location as on a side wall 13 of the room. Since such heating source emits heat substantially only by way of thermal radiation, the back side of the panel is covered by a reflecting material such as of a silvery metal.

Energizing current is supplied to the heating panel from a source 14 which may typically be a 24-volt line. This source is connected to the panel by means of a circuit 15 which serially includes a master on-off switch 16 and a room thermostat 17.

The thermostat 17 has a case 18 adapted to be mounted on a wall of the room and which is made as of metal, certain walls of the case being apertured as at 19 (Fig. 1) to expose the thermostat proper to convection heating. The thermostat proper comprises a bimetal strip 20 mounted at one end 21 and having a contact 22 on its free end. This movable contact cooperates with a stationary contact 23 carried at the free end of a strip 24 mounted at its other end as at 25. These elements are enclosed in a sealed envelope 26 filled with a conductive inert gas such as hydrogen to reduce the response lag of the bimetal strip and to insure long and trouble-free contact operation.

Also enclosed in the envelope 26 are two small resistance heaters 27 and 28. The heater 27 is used as a means of setting the thermostat to a desired ambient temperature, for a given current in the other heater 28, at which the contacts will break. The heater 27 is connected across the supply line 14 via a series rheostat 29 operable by a suitable control knob 30 extending from the case 18 (Fig. 1). By adjusting this rheostat the thermostat can be set to maintain any desired degree of room heating, as will appear. The less the resistance of the rheostat, the greater will be the current through the heater 27 and the lower will be the temperature at which the room will be maintained. This rheostat may be tapered so that linear variation in control temperature will occur with variation in the control knob 30. Connected across the contacts 22 and 23, externally of the envelope 26, is a condenser 31 to reduce arcing.

The heater 28 is an operating one to provide a localized source of heat to influence the bimetal strip 20 according to the energizing current to the radiant-heating panel. This heater may be connected serially in the supply circuit 15. Under influence of the heater 28, the contacts will make and break. When the bimetal member 20 is under only the influence of the heater 27 and the surrounding ambient air, the contacts will be normally closed. Current then flows through the supply line to energize the radiant-heating panel. This current also flows through the series heater 28 to increase the temperature in the envelope and to cause the contacts gradually to open. When the contacts open, current ceases to flow in the line, the gas in the envelope cools, and the contacts gradually reclose. The per cent of time of each make-break cycle that the contacts are closed depends upon the heat losses to the ambient air, which in turn depends upon the temperature of the air, as will be more fully apparent from the following description of the operation of the present system.

If the ambient temperature should fall at the thermostat as because of a colder outside temperature, the contacts will remain closed during a greater part of each cycle to increase the energization of the heating panel 11. The heating panel will then radiate more heat into the room and will itself have an increased surface temperature. Since the irradiated objects in the room then absorb more heat, their temperatures will rise to cause some increase in the air temperature. By convection, the temperature of the ambient at the thermostat will then increase in response to the original fall in the ambient temperature caused by the colder outside temperature. The net change though is one of a substantial decrease in room temperature.

The foregoing may be more apparent from another viewpoint. It is clear that a decrease in outdoor temperature calls for more heat in the room. This greater heat is obtainable only by greater energization of the heating panel 11. Such greater energization of the heating panel is accompanied by greater energization of the series heater 28. Since the heat from the series heater 28 and from the ambient air are the only variable heat sources normally affecting the bimetal 20—the heat from the heater 27 being fixed for any one setting of the knob 30—an increase in heat from the heater 28 is necessarily accompanied by a decrease in temperature of the ambient for any given setting of the thermostat. Because the bimetal strip 20 is so much more closely thermally associated with the heater 28 than it is with the heating panel 11 via the irradiant objects and air in the room, it follows that in the present system the decrease in room-air temperature with increase in thermal radiation from the heating panel 11 tends to be particularly marked. It is this reverse variation of room temperature with variation in energization of the heating panel 11, and the accompanying proportional control resulting from the varying per cent of contact-make period to contact-break period of each cycle, as carried out in the present invention, that enables a substantially uniform comfort level to be maintained from a radiant heating source and at high operating efficiency.

It follows also from the foregoing description that during a contact-make period the bimetal will be thermally influenced by the adjacent heater 28 to open the contacts and shut off the energizing current to the heating panel before the ambient air temperature rises appreciably. Thus, overshooting of temperature because of thermal time lags in the heating system is positively avoided.

The amount of temperature variation in a room with the present system will vary from one installation to another depending upon the number of heating panels used in the room and the rate at which the heat is lost to the outside. For this reason a variable shunt resistor 32 is connected in shunt across the heater 28. This resistor is mounted in the case 17 externally of the envelope 26. Once this resistor has been adjusted it is left at its optimum setting for any given installation.

The foregoing description is intended to be illustrative and not limitative of the present invention since the same is subject to changes and modifications without departure from the scope of the invention, which I endeavor to express according to the following claims.

I claim:

1. A heating system for a room or other like enclosure comprising an electrically-energizable radiant source of heat for heating said enclosure by thermal radiation, an electric energizing circuit for said radiant-heat source, a make-break type thermostatic switch device positioned in said enclosure out of proximity with said radiant-heat source and serially connected in said circuit for controlling said radiant-heat source, said thermostatic switch device including a thermostatic element responsive to rise of the ambient temperature immediately at said switch above a predetermined threshold to open said switch and responsive to fall of that temperature below said threshold to close said switch, said thermostatic element being thermally exposed to convection heat from said heat source and being substantially unresponsive to radiant heat from said source, and means for controlling said thermostatic switch device to maintain a substantially uniform bodily comfort in said enclosure as the outside temperature falls, comprising an electrically-energizable heating element in proximity with said thermostatic element and connected permanently in circuit with said heat source and energized at all times when and only when said heat source is energized for producing a false rise in temperature at said switch device in proportion to the energization of said heat source whereby said threshold temperature at said switch device is reached at substantially lower ambient temperatures of said enclosure as the outside temperature falls to require more heat from said radiant-heat source.

2. In an intermittently-operated heating system for a room including a source of electrical energy: the combination of an electrically-energizable radiant-type heater in said room for heating objects therein by thermal irradiation; an energizing circuit for connecting said heater to said source; a normally-closed make-break type thermal switch in said room out of proximity with said radiant heater and exposed to convection heat from said objects under irradiation by said heater, said thermal switch being responsive to said convection heat and being substantially unresponsive to thermal irradiation; means serially connecting said thermal switch in said energizing circuit; a localized electrically-energizable heating element in close thermal association with said thermal switch; and means permanently connecting said localized heating element in cricuit with said radiant heater for energization simultaneously therewith at all times when and only when said heat source is energized whereby a localized heat supplementing said convection heat during energization of said radiant heater is produced to cause intermittent opening of said thermal switch.

JOHN J. DIETZ.

References Cited in the file of this patent
UNITED STATES PATENTS

| Number | Name | Date |
| --- | --- | --- |
| 1,697,040 | Appelberg | Jan. 1, 1929 |
| 1,700,661 | Appelberg | Jan. 29, 1929 |
| 2,209,768 | Dillman | July 30, 1940 |
| 2,220,061 | Brown | Nov. 5, 1940 |
| 2,363,169 | Fischer | Nov. 21, 1944 |
| 2,499,906 | Crise | Mar. 7, 1950 |